United States Patent [19]

Boor

[11] Patent Number: 5,437,206

[45] Date of Patent: Aug. 1, 1995

[54] ROTATING BRAKE ACTUATOR

[76] Inventor: Richard G. Boor, 210 Dube, Chateauguay, Quebec, Canada, J6K 2P4

[21] Appl. No.: 125,778

[22] Filed: Dec. 23, 1993

[51] Int. Cl.⁶ .............................................. G05G 5/06
[52] U.S. Cl. ..................... 74/489; 74/502.2; 74/506; 74/551.9; 74/558.5; 188/24.22
[58] Field of Search ................ 74/488, 505, 506, 507, 74/489, 502.2, 551.8, 551.9, 558, 558.5; 188/24.22, 24.18; 280/152.1, 152.3

[56] References Cited

U.S. PATENT DOCUMENTS

| 637,267 | 11/1899 | Leaycraft | 74/489 |
| 2,776,579 | 1/1957 | Nichel | 74/488 |
| 4,141,567 | 2/1979 | Scott | 74/551.9 |
| 4,342,369 | 8/1982 | Ransom | 74/558 |
| 4,438,661 | 3/1984 | Cullen | 74/551.9 |
| 4,893,519 | 1/1990 | Corso et al. | 74/558.5 |
| 5,333,515 | 8/1994 | Schneider | 74/502.2 |

FOREIGN PATENT DOCUMENTS

| 216373 | 12/1960 | Austria | 74/489 |
| 1088089 | 11/1953 | France | 74/489 |
| 170684 | 3/1952 | Germany | 74/489 |

Primary Examiner—Charles A. Marmor
Assistant Examiner—David Fenstermacher

[57] ABSTRACT

A rotating brake actuator for a bicycle in which a rotation of a handle grip tensions a cable connected to a friction brake of the bicycle. The actuator includes a rotatable handle assembly which may be secured to a handlebar of the bicycle by an expandable end cap. A pulley is coupled to the handle assembly and eccentrically supports an end of the cable such that a rotation of the handle grip tensions the cable to apply the brake. The actuator includes a digit operated release assembly that prevents a rotation of the handle assembly to preclude an unintentional application of the brake.

5 Claims, 3 Drawing Sheets

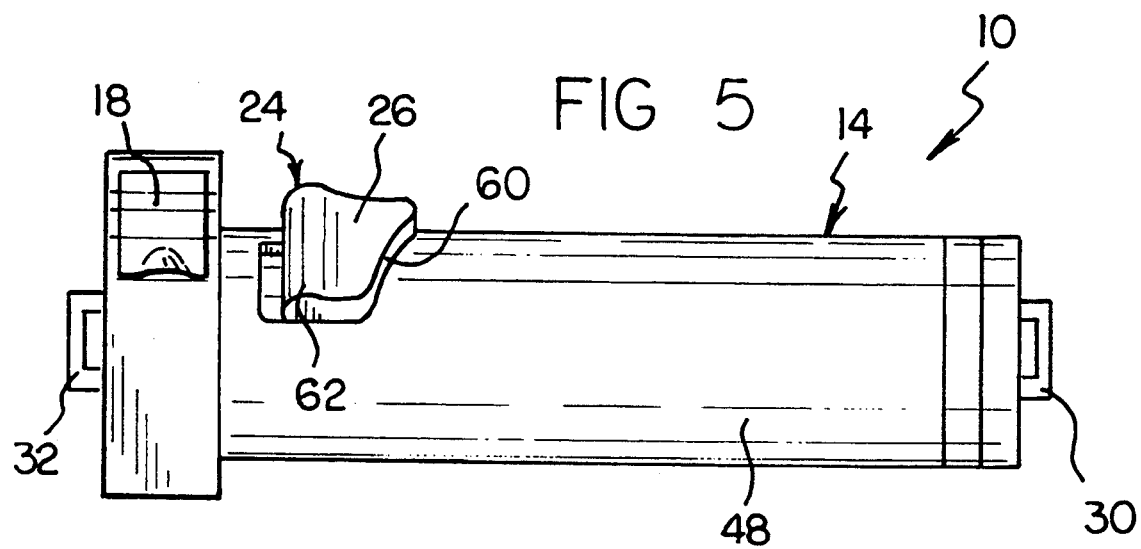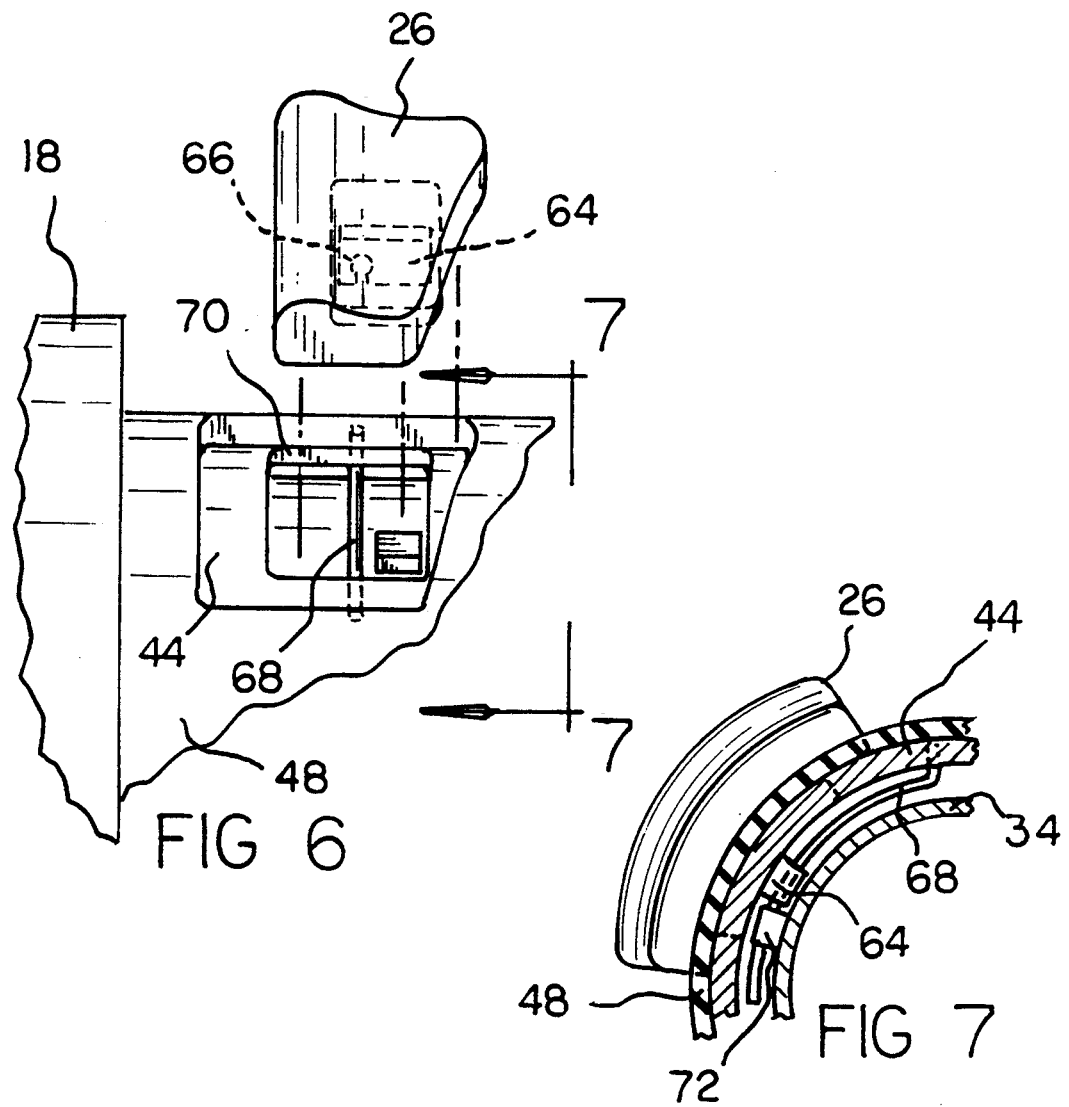

ROTATING BRAKE ACTUATOR

BACKGROUND OF THE INVENTION

1. Field of the Invention

The present invention relates to brake actuators and more particularly pertains to a rotating brake actuator which may be utilized for operating a friction brake of a bicycle.

2. Description of the Prior Art

The use of brake actuators is known in the prior art. More specifically, brake actuators heretofore devised and utilized for the purpose of operating bicycle friction brakes are known to consist basically of familiar, expected and obvious structural configurations, notwithstanding the myriad of designs encompassed by the crowded prior art which have been developed for the fulfillment of countless objectives and requirements.

For example, a bicycle brake lever assembly is illustrated in U.S. Pat. No. 5,050,444 which comprises a mount bracket having a front end and a base end fixable to a bicycle handlebar, and a brake lever extending downward from the mount bracket and having a connecting end pivotally connected to the front end of the mount bracket which further has an upper surface elongated enough to work as a palm rest for a rider.

A brake lever device for bicycles is disclosed in U.S. Pat. No. 4,909,094 in which a position of the center of rotation of the brake lever is close to the central axis of the handlebar to decrease and overall width of the device.

Another patent of interest is U.S. Pat. No. 4,653,613 which discloses a rotating grip brake for bicycles. Braking is applied by a rotation of a handlebar grip through a lever system to pull flexible cables operating friction brakes at one or both wheels of the bicycle. A pair of cable pulling units may be provided, each individually controlling a brake on the front or rear wheel, such that cables to both wheel brakes may be actuated by a single unit.

While these devices fulfill their respective, particular objectives and requirements, the aforementioned patents do not describe a rotating brake actuator for a bicycle in which a rotation of a handle grip tensions a cable connected to a friction brake of the bicycle that includes a digit operated release assembly operable to prevent a rotation of the handle grip to preclude an unintentional application of the brake. In this respect, the rotating brake actuator according to the present invention substantially departs from the conventional concepts and designs of the prior art, and in so doing provides an apparatus primarily developed for the purpose of selectively actuating a brake of a bicycle through a rotatable handle grip which includes a digit operated release assembly to preclude an unintentional application of the brake.

SUMMARY OF THE INVENTION

In view of the foregoing disadvantages inherent in the known types of brake actuators now present in the prior art, the present invention provides a new rotating brake actuator construction wherein the same can be utilized to selectively operate a friction brake of a bicycle. As such, the general purpose of the present invention, which will be described subsequently in greater detail, is to provide a new rotating brake actuator apparatus which has many of the advantages of the brake actuators mentioned heretofore and many novel features that result in a rotating brake actuator which is not anticipated, rendered obvious, suggested, or even implied by any of the prior art brake actuators, either alone or in any combination thereof.

To attain this, the present invention essentially comprises a rotating brake actuator for a bicycle in which a rotation of a handle grip tensions a cable connected to a friction brake of the bicycle. The actuator includes a rotatable handle assembly which may be secured to a handlebar of the bicycle by an expandable end cap. A pulley is coupled to the handle assembly and eccentrically supports an end of the cable such that a rotation of the handle grip tensions the cable to apply the brake. The actuator includes a digit operated release assembly that prevents a rotation of the handle assembly to preclude an unintentional application of the brake.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new rotating brake actuator apparatus which has many of the advantages of the brake actuators mentioned heretofore and many novel features that result in a rotating brake actuator which is not anticipated, rendered obvious, suggested, or even implied by any of the prior art brake actuators, either alone or in any combination thereof.

It is another object of the present invention to provide a new rotating brake actuator which may be easily and efficiently manufactured and marketed.

It is a further object of the present invention to provide a new rotating brake actuator which is of a durable and reliable construction.

An even further object of the present invention is to provide a new rotating brake actuator which is susceptible of a low cost of manufacture with regard to both materials and labor, and which accordingly is then susceptible of low prices of sale to the consuming public, thereby making such rotating brake actuators economically available to the buying public.

Still yet another object of the present invention is to provide a new rotating brake actuator which provides in the apparatuses and methods of the prior art some of the advantages thereof, while simultaneously overcoming some of the disadvantages normally associated therewith.

Still another object of the present invention is to provide a new rotating brake actuator for a bicycle in which a rotation of a handle grip tensions a cable connected to a friction brake of the bicycle.

Yet another object of the present invention is to provide a new rotating brake actuator which includes a digit operated release assembly to preclude an unintentional application of the brake.

Even still another object of the present invention is to provide a new rotating brake actuator which may be easily installed to existing bicycle handlebars without a substantial modification thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a bottom plan view of the invention.

FIG. 6 is an enlarged, exploded view of a portion of the invention.

FIG. 7 is a cross sectional view as viewed from line 7—7 of FIG. 6.

DESCRIPTION OF THE PREFERRED EMBODIMENT

Figure 1:
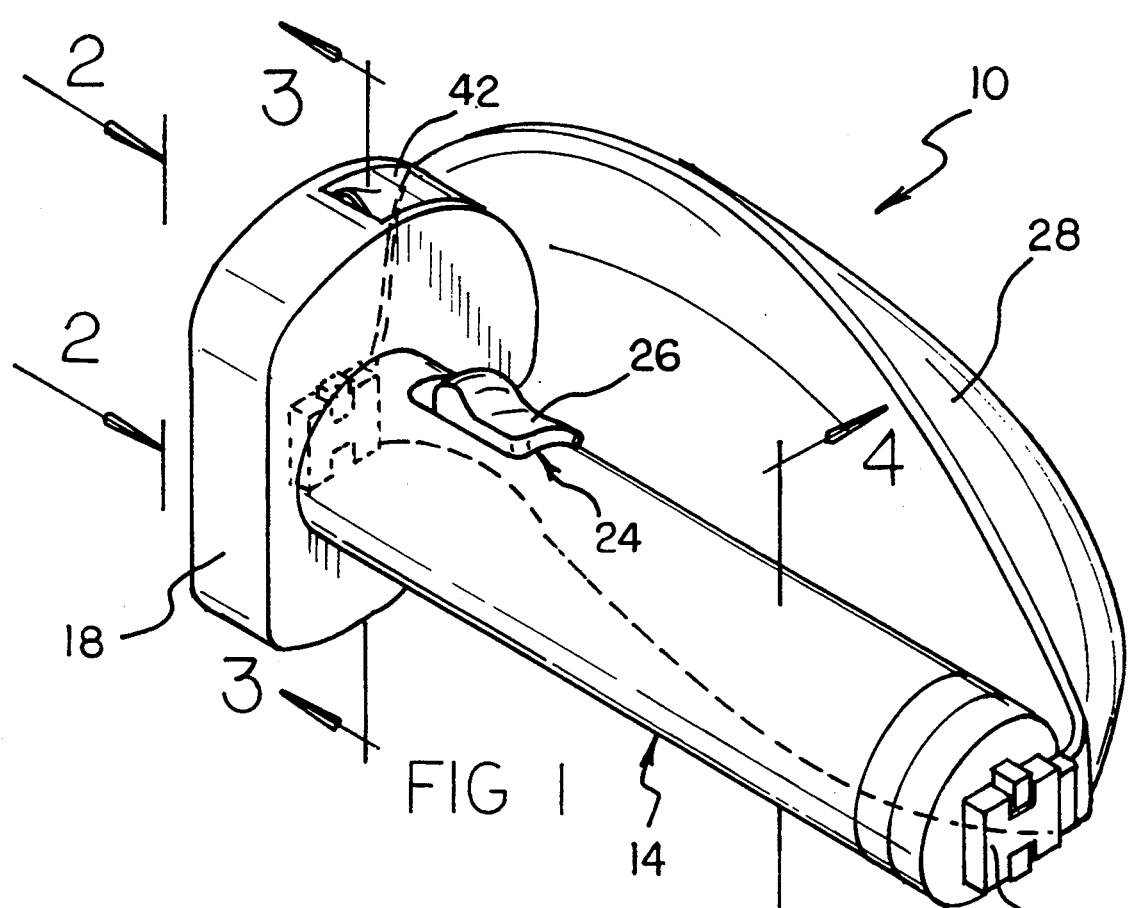
FIG. 1 is a perspective view of a rotating brake actuator comprising the present invention.
Figure 2:
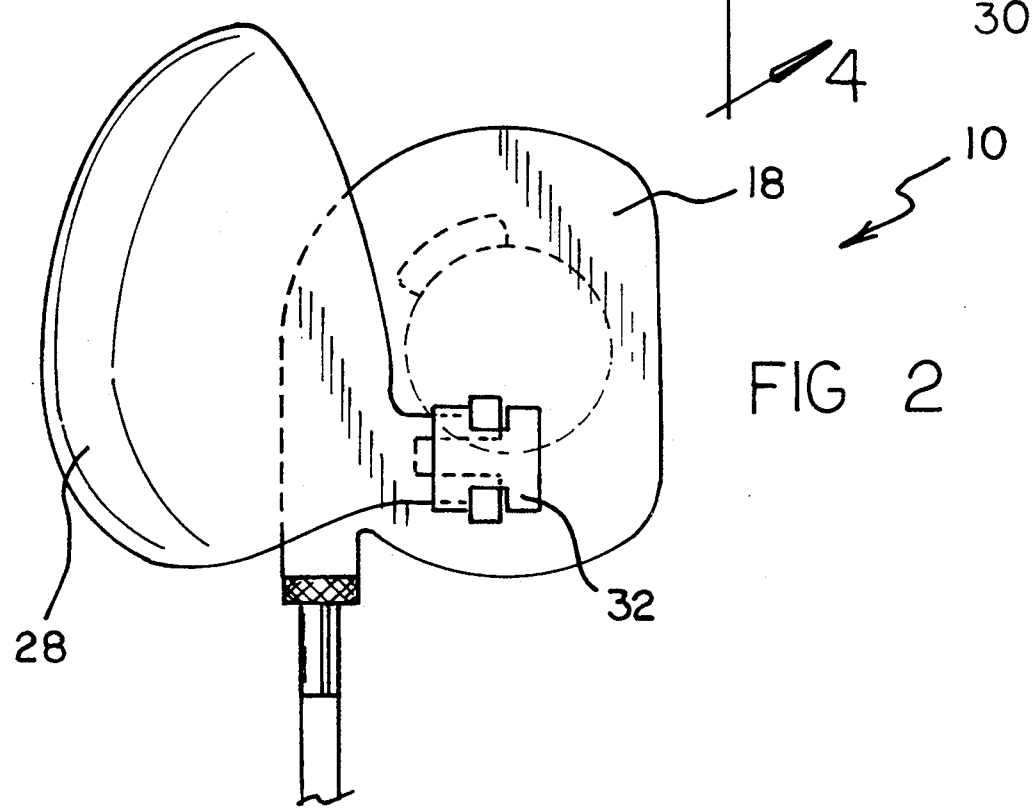
FIG. 2 is a side elevation view as viewed from line 2—2 of FIG. 1.

With reference now to the drawings, and in particular to FIGS. 1-7 thereof, a new rotating brake actuator embodying the principles and concepts of the present invention and generally designated by the reference numeral 10 will be described.

The rotating brake actuator 10 may be positioned over an end of a handlebar 12 of a conventional bicycle in place of a grip typically present thereon. The rotating brake actuator 10 comprises a rotatable handle assembly 14 which may be rotated with respect to the handlebar 12 and is mechanically coupled to a pulley 16 contained within a pulley housing 18 proximate an end of the rotatable handle assembly. A cable 20 contained within a cable sheath 22 is operatively connected to the pulley 16 such that a rotation of the handle assembly 14 will tension the cable, thereby actuating a conventional friction brake connected to a distal end of the cable. A release assembly 24 precludes a rotation of the handle assembly 14 to prevent an unintentional application of the friction brake while riding the bicycle. A release button 26 may be operated by a user to disengage the release assembly 24 and allow the rotatable handle assembly 14 to rotate with respect to the handle bar 12, thereby actuating the friction brake of the bicycle. A handle guard 28 is operable to protect a user's hand from brush and the like and is secured to the rotatable handle assembly 14 and the pulley housing 18 by a pair of guard mounts 30, 32, respectively.

In use, the rotating brake actuator 10 may be rotated in a well understood manner to tension the cable 20 so as to cause an actuation of the friction brake of the bicycle. The rotatable handle assembly 14 may be selectively locked into a predetermined position by the release assembly 24 which precludes an unintentional application of the friction brake. To engage the release assembly 24 and apply the friction brake of the bicycle, a user may bias the release button 26 towards the pulley housing 18 and then rotate the handle assembly 14.

Figure 4:
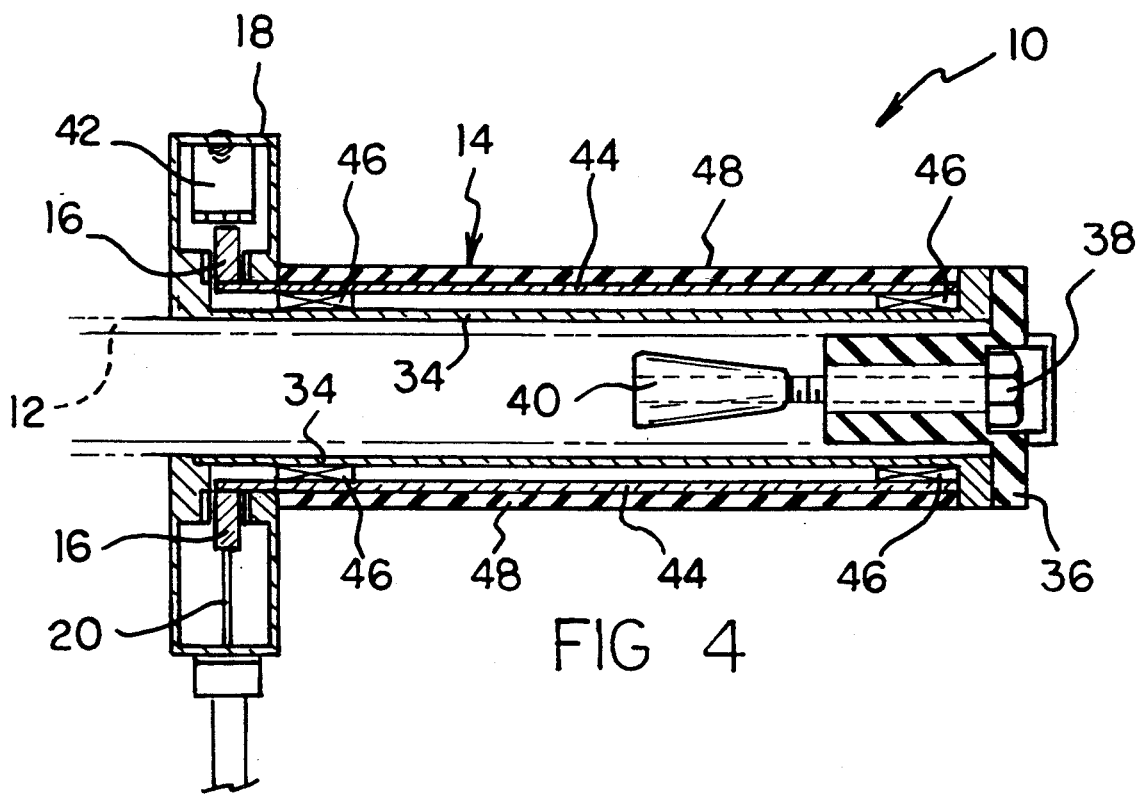
FIG. 4 is a cross sectional view taken along line 4—4 of FIG. 1.

More specifically, it will be noted that the rotating brake actuator 10 comprises a base sleeve 34 having a substantially tubular shape adapted to fit over the handlebar 12. The base sleeve 34 is secured to the handlebar 12 by an end cap 36 which is positioned partially within an interior of the handlebar and frictionally engaged thereto by a bolt 38 engaged to an expander 40, as best illustrated in FIG. 4. The expander 40 is operable to expand a portion of the end cap 36 in a well understood manner. The pulley housing 18 is integrally or otherwise fixedly secured to the base sleeve 34 and it includes an access door 42 which permits access to an interior thereof to facilitate an installation of the cable 20.

A handle tube 44 is concentrically positioned upon the base sleeve 34 and is supported relative thereto upon a plurality of bearings 46 at respectively opposed ends thereof. The handle tube 44 projects into the pulley housing 18 where it is integrally or otherwise connected to the pulley 16 which resides therein. A gripping surface 48 is secured to an exterior of the handle tube 44 by an adhesive or the like and provides a comfortable gripping surface for a user.

Figure 3:
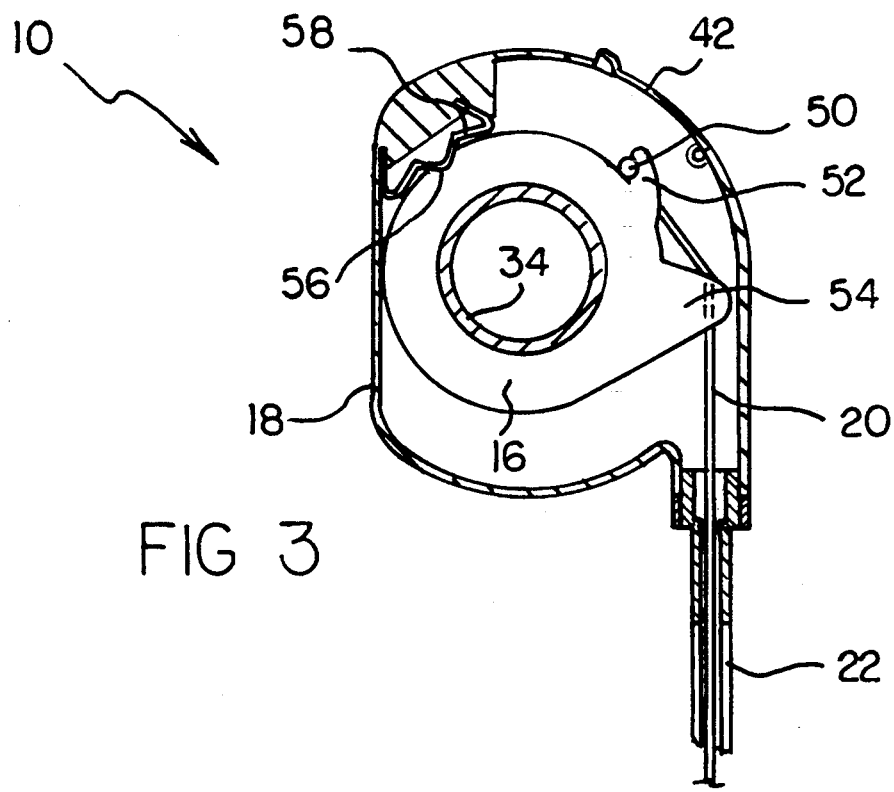
FIG. 3 is a cross sectional view taken along line 3—3 of FIG. 1.

The cable 20 includes a cable end 50 which may be positioned within a catch 52 of the pulley 16, as best illustrated in FIG. 3. The cable 20 is further supported by a raised portion 54 of the pulley 16 through which the cable passes. The raised portion 54 is operable to support the cable 20 at a predetermined distance away from a center of the handlebar 12 such that a rotation of the pulley about the center of the handlebar will cause the cable 20 to move with respect to the cable sheath 22. The cable sheath 22 is supported at an end thereof by the pulley housing 18 and includes a conventional unlabeled threaded adjustment tube which facilitates an adjustment of the cable sheath with respect to the pulley housing. The pulley 16 includes a notch 56 proximate a perimeter thereof which is operable to engage a snap spring 58 positioned upon an interior of the pulley housing 18. The snap spring 58 is operable to engage the notch 56, thereby releasably securing the handle tube 44 in a predetermined position.

In use, a user may rotate the handle tube 44 by applying a twisting motion thereto which will cause the pulley 16 to rotate along therewith. As the pulley 16 rotates, the cable 20 will be drawn out of the cable sheath 22, thereby applying the friction brake of the bicycle in a conventional manner. While the rotating brake actuator 10 is described herein as accommodating a single cable, it should be understood that a plurality of pulleys may be employed within the pulley housing 18 to simultaneously actuate a plurality of cables. In this manner, the rotating brake actuator 10 may be utilized to actuate more than one brake of a bicycle.

FIGS. 5, 6, and 7 illustrate the release assembly 24 which may be utilized to releasably secure the handle tube 44 in the predetermined position so that the brake of the bicycle will not be unintentionally actuated when travelling over rough or uneven terrain. The release assembly 24 comprises a release button 26 having both an arcuate contour 60 and a raised contour 62 formed thereon. The arcuate contour 60 allows a user to bias the release button 26 towards the pulley housing 18 by a rotating motion of the user's hand which causes an index finger of the hand to engage the arcuate contour. The arcuate contour 60 is shaped in such a manner so as to provide a movement of the release button 26 towards the pulley housing 18 upon such an engagement. The raised contour 62 of the release button 26 permits a user's thumb to bias the release button towards the pulley housing 18 in a similar manner.

The release button 26 includes a release projection 64 having a spring cavity 66 integrally formed therein, as best illustrated in FIG. 6. A release spring 68 formed of a substantially resilient, arcuately shaped wire is positioned upon an interior surface of the handle tube 44 and secured thereto at one end of the release spring. An aperture 70 in the handle tube 4 allows the spring cavity 66 of the release button 26 to pass partially through the handle tube and engage the release spring 68. The release button 26 may then be moved left or right within the aperture 70 of the handle tube 44 by either of the two methods described above. Additionally or alternatively, the release button may be constructed such that a depression of the button will allow the handle tube 44 to rotate and subsequently actuate the friction brake of the bicycle.

The release projection 64 of the release button 26 is operable to engage a base projection 72 which is integrally or otherwise fixedly secured to the base sleeve 34, as shown in FIG. 7, thereby securing the handle tube 44 in the predetermined position to prevent an accidental application of the friction brake of the bicycle. The base projection 72, in the preferred embodiment, is shaped in such a manner such that a positive motion of the release button 26 towards the pulley housing 18 must be accomplished along with a rotation of the handle tube 44 towards the predetermined position and to include releasing button 26 to secure the handle tube 44 in the predetermined position. Alternatively, the base projection 72 may be wedge-shaped, such that the release button 26 will automatically secure the handle tube 44 in the predetermined position upon a rotation of the handle tube towards the same.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new rotating brake actuator for use with a bicycle having a cable operatively coupled to at least one friction brake, said actuator comprising:

a base sleeve positionable upon an end of a handlebar of said bicycle;

a handle grip concentrically positioned upon and spaced from said base sleeve and rotatably supported relative thereto by at least one bearing; said handle grip and said base sleeve having spacing therebetween;

a pulley mechanically coupled to said handle grip such that a rotation of said handle grip proportionally rotates said pulley, said pulley being operable to receive and support an end of said cable such that said at least one friction brake may be operated by a manual rotation of said handle grip; and;

a release assembly means operable to selectively preclude a rotation of said handle grip with respect to said base sleeve, said release assembly means comprising a release button movably mounted in said handle grip and projecting into said spacing and selectively operated by a user to allow a rotation of said handle grip with respect to said base sleeve, said release assembly means further including a projection extending into said spacing and fixed to said base sleeve for selective engagement with said release button.

2. The new rotating brake actuator of claim 1, wherein said pulley further comprises a raised portion through which said cable passes, said raised portion being operable to support said cable a predetermined distance away from a center of said handlebar.

3. The new rotating brake actuator of claim 2, and further comprising a pulley housing coupled to said base sleeve, said pulley housing being operable to at least partially enclose said pulley.

4. The new rotating brake actuator of claim 3, and further comprising an end cap positionable partially within an interior of said handle bar, a bolt passing through an aperture in said end cap, and a substantially wedge-shaped expander threadably coupled to said bolt whereby a tightening of said bolt draws said expander into said aperture to frictionally secure said end cap and said base sleeve to said handlebar.

5. The new rotating brake actuator of claim 4, and further comprising a handle guard releasably coupled to both said pulley housing and said end cap and extending arcuately therebetween.

* * * * *